United States Patent

Mrotek et al.

[11] Patent Number: 5,776,633
[45] Date of Patent: Jul. 7, 1998

[54] CARBON/CARBON COMPOSITE MATERIALS AND USE THEREOF IN ELECTROCHEMICAL CELLS

[75] Inventors: Edward N. Mrotek, Grafton, Wis.; Benjamin Reichman, West Bloomfield, Mich.; MengPing Yin, Milwaukee, Wis.

[73] Assignee: Johnson Controls Technology Company, Plymouth, Mich.

[21] Appl. No.: 727,856

[22] Filed: Oct. 7, 1996

Related U.S. Application Data

[63] Continuation of Ser. No. 493,813, Jun. 22, 1995, abandoned.

[51] Int. Cl.$^6$ ............................................. H01M 4/02
[52] U.S. Cl. ............................ 429/218; 361/503; 361/504; 264/105; 204/291
[58] Field of Search ........................... 429/192, 194, 429/218, 210; 361/324, 315, 301, 309, 311, 312, 314, 433, 502, 503, 504, 505; 423/447.1; 264/105, 175, 280; 204/291-294

[56] References Cited

U.S. PATENT DOCUMENTS

| | | |
|---|---|---|
| 4,115,528 | 9/1978 | Christner et al. |
| 4,198,382 | 4/1980 | Matsui ................................ 423/445 |
| 4,215,161 | 7/1980 | Seibold et al. ........................ 427/228 |
| 4,506,028 | 3/1985 | Fukuda et al. |
| 4,659,624 | 4/1987 | Yeager et al. ........................ 425/408 |
| 4,737,889 | 4/1988 | Nishino et al. ...................... 361/433 |
| 4,740,434 | 4/1988 | Hirota et al. ........................ 429/105 |
| 4,814,307 | 3/1989 | Funabashi et al. ................... 502/101 |
| 4,915,985 | 4/1990 | Maxfield et al. .................... 427/126.6 |
| 5,071,631 | 12/1991 | Takabatake. |
| 5,150,283 | 9/1992 | Yoshida et al. ..................... 361/502 |
| 5,172,307 | 12/1992 | Tabuchi et al. ..................... 361/502 |
| 5,173,362 | 12/1992 | Tekkanat. |
| 5,217,657 | 6/1993 | Engle ................................. 264/29.5 |
| 5,225,296 | 7/1993 | Ohsawa et al. ...................... 424/218 |
| 5,393,617 | 2/1995 | Klein ................................. 429/57 |
| 5,621,607 | 4/1997 | Farahmandi et al. ................. 361/502 |

*Primary Examiner*—M. Nuzzolillo
*Attorney, Agent, or Firm*—Quarles & Brady

[57] ABSTRACT

Carbon/carbon composite materials for use in electrochemical cells are prepared by carbonizing a resin material used to bind a layer of carbon containing material to convert the resin to residual carbon. In one embodiment of the invention, the carbon containing material is a mixture of activated carbon fibers and activated carbon powder. In another embodiment, an activated carbon fabric is used instead of the discrete carbon fibers. Substantial improvements in mechanical properties, resistivity and surface area are achieved in the present invention. The composite materials may be used in the fabrication of electrodes and bipolar electrical devices such as capacitors.

22 Claims, No Drawings

CARBON/CARBON COMPOSITE MATERIALS AND USE THEREOF IN ELECTROCHEMICAL CELLS

This is a continuation of U.S. patent application Ser. No. 08/493,813, filed Jun. 22, 1995, now abandoned.

BACKGROUND OF THE INVENTION

1. Field of the Invention

The present invention relates generally to the field of electrically conductive carbon materials for use in electric storage batteries, double-layer capacitors or other electrochemical cell configurations and to processes for producing the same. More specifically, the present invention relates to techniques for producing electrode materials having a high surface area, high mechanical strength and low resistivity. In its most preferred forms, the present invention relates to the field of preparing carbon/carbon composites using one of two techniques: the mixture of activated carbon fibers and activated carbon powder in a resin material and the subsequent cure and carbonization of the resin; or the use of activated carbon fabric, impregnated with a resin and carbon powder and the subsequent cure and carbonization of the resin. In the latter embodiment, layer thickness may be easily selected by layering the fabric. The invention also relates to electrodes and bipolar devices made from such materials and to a method for fabricating such electrodes and devices.

2. Description of the Prior Art

Electrode structures of various kinds are employed in double-layer capacitors and electrochemical cells. Such electrodes have been employed as active materials in electrochemical storage cells, such as batteries, as well as in capacitors. They can also be used in other systems in which electrochemical reactions take place, such as electrolysis, electrosynthesis and electrodeposition systems.

The physical properties of the electrode material are extremely important, as are factors such as the resistivity and surface area of the electrode. Several prior systems have employed carbon as the electrode material, including prior art uses of the technique of carbonizing a layer containing carbon and a resin, to convert the resin to residual carbon. For example, in U.S. Pat. No. 4,115,528 issued Sep. 19, 1978 to Christner, et al. for "Method For Fabricating A Carbon Electrode Substrate", a carbon fuel cell electrode is prepared by coating carbon fibers with a mixture of furfuryl alcohol and a catalyst which polymerizes the alcohol, forming the fibers into a mat or sheet and heating the mat to polymerize the alcohol and cure the resin. The sheet so prepared is then further heated to carbonize the resin.

Another technique for forming a fuel cell electrode substrate involves mixing 30% to 50% by weight of carbon fiber, 20% to 50% by weight of a binder and a 20% to 50% by weight of an organic granule, as discussed in Fukuda, et al. U.S. Pat. No. 4,506,028 issued Mar. 19, 1985 and entitled "Process For Preparing A Fuel Cell Electrode Substrate Comprising Carbon Fibers".

A "Porous Carbon-Carbon Composite And Process For Producing The Same" is described by Takabatake in U.S. Pat. No. 5,071,631 issued Dec. 10, 1991. This composite material has a porosity of 25% to 85% and contains 60% by weight or more of aggregate particles having an aspect ratio of 10 or smaller, and reinforced in one direction with carbon fiber. In the principal example of this patent, carbonized, powdered petroleum pitch is impregnated with additional petroleum pitch, which is again carbonized.

Yet another system for an "Electrode And Method Of Producing The Same" is discussed in Ohsawa, U.S. Pat. No. 5,225,296 issued Jul. 6, 1993. In this patent, a phenolic resin is deposited on a phenolic resin fiber sheet and the composite is carbonized. Following carbonization, the sheets are impregnated with a silica colloid and dried.

Finally, in Tabuchi, U.S. Pat. No. 5,172,307 issued Dec. 15, 1992 for "Activated Carbon/Polyacene Composite And Process For Producing The Same" activated carbon/polyacene materials are prepared by using a mixture of activated carbon powder or carbon fiber and a thermosetting resin, such as a phenolic resin, and subjecting the mixture to heat treatment in a non-oxidizing atmosphere at between 600° C. and 1000° C. Such temperatures ensure full carbonization of the thermosetting resin. Throughout the patent, the inventors describe only the use of carbon powders or fibers.

From the foregoing, it can be seen that carbon containing electrode materials have been disclosed for a wide variety of applications, and that the relative loading of activated carbon in the final electrode sheets is typically low (for example about 50% to 60%). While high surface area is the desired goal in several of the aforementioned patents, higher loading levels are important to increase surface area. However, mechanical strength has typically suffered in prior art designs. Moreover, while not expressly stated in the patents, a problem with some prior art designs using carbon fibers is that, while such fibers can be loaded to somewhat higher levels, the expense of doing so is too great.

An electrode system which achieves desirable loading levels without decreasing the mechanical properties of the system would represent a significant advance in the art.

SUMMARY OF THE INVENTION

The present invention features carbon/carbon composites useful as components of electrode structures for batteries, for use in double layer capacitors and in other devices where electrochemical reactions take place.

The present invention also features carbon/carbon composite materials which are high in surface area and which have desirable mechanical properties. Still further, the present invention features carbon/carbon composite materials which are low in resistivity and which may be fabricated in a variety of configurations for use in the various types of devices described above.

How these features and other aspects of the present invention are accomplished will be described in the following detailed description of the preferred embodiments. Generally, however, two related techniques are described for providing carbon/carbon composite materials having the aforementioned benefits, both involving the use of activated carbon fibers and activated carbon powder. In one aspect of the invention, the fibers are used as discrete components and mixed with activated carbon powder and a resin, such as a phenolic resin. After curing, the resultant electrode structure is subjected to a carbonization step to reduce the resin to residual carbon, leaving a strong, high surface area substrate with low resistance. In the other embodiment of the invention, the carbon fibers are provided in the form of an activated carbon cloth which is mixed with the activated carbon powder and the resin and subjected to the same curing and carbonization steps as in the other embodiment. Through the use of the techniques of the present invention, carbon/carbon composites having significantly improved strength, low resistivity and high surface area result, when compared to those which use either powder or fiber alone. In addition, the present invention permits the use of higher loadings of carbon than have been described in the prior art.

Other aspects of the invention include a novel technique for fabricating electrodes from composite materials for a bipolar electrochemical or capacitor device made from these electrodes. In such devices, two carbon composite wafers are secured to one another using a conductive rubber cement. The rubber cement forms a non-porous conductive barrier between the two carbon composite wafers to form a bipolar electrode. A number of such bipolar electrodes can be assembled to form a bipolar capacitor device. A separator, such as microporous polyethylene, saturated with electrolyte is preferably used to separate the bipolar electrodes. The fabrication method disclosed herein has the advantage that the conductive rubber barrier can be made very thin (e.g. 1 mil) and fabrication costs are reduced.

Other ways in which the features of the present invention are accomplished will be described in the following sections of the specification and still others will become apparent to those skilled in the art after they have read and understood the present invention. Such other ways are deemed to fall within the scope of the invention.

DETAILED DESCRIPTION OF THE PREFERRED EMBODIMENT

Before beginning the detailed description of the preferred embodiments, several general comments can be made which will be useful in defining terms and in gaining an understanding of the general applicability and scope of the invention. As mentioned previously, one application for such carbon/carbon composites is in the art of storage batteries, for example, as active material in electrodes for batteries, as well as in numerous other devices such as double layer capacitors, and in electrosynthesis, electrodeposition and electrolysis systems. In fact, the carbon/carbon composite may be used in various other applications wherein carbon electrodes have previously been employed using such manufacturing techniques as pasting, laminating, etc.

The carbon useful in the present invention is in three forms, each of which may be available from a variety of sources. The carbon powder referred to herein preferably has a particle size of 0.5 to 300 microns, one example being activated carbon SX2 available from Norit. Other activated carbon powders may be substituted for the aforementioned materials. When the term "activated carbon powder" is used in the remainder of this specification and in the claims, it is meant to include these types of materials.

Another form of activated carbon useful in the present invention is activated carbon fibers, such as fibers having an average fiber length of 1 to 6 mm, and a diameter of 5 to 20 microns. One such fiber useful in the present invention is available from Osaka Gas and is designated as Product No. A10. A wide variety of other activated carbon fibers are also available and may be employed in the present invention. When the term "activated carbon fiber" is used throughout the remainder of the specification and in the claims, it is meant to refer generally to these materials.

Yet a third type of material is an activated carbon fabric having a high surface area (approximately 1,300 m$^2$/g) with low resistivity. On such fabric is available from Toyobo under the designation AN062. The material has a relatively low density and a thickness of approximately 10 mils. When the term "activated carbon cloth" is used throughout the remainder of the specification and in the claims, it is meant to refer generally to these types of carbon fiber fabrics.

In addition to the carbon materials, a resin is employed in each embodiment, the preferred resins being phenolic resins such as those described in the aforementioned Tabuchi, et al. '307 patent, the disclosure of which is hereby expressly incorporated by this reference. Other phenolic resins (phenolformaldehyde resins) can also be used, as can the other types of binders discussed in the aforementioned prior art, e.g. the furfuryl alcohol polymer discussed in the Khristner, et al. '528 patent. Generally, any resin which may bind the carbon-containing materials useful herein and which may be carbonized at temperatures which will not destroy the mechanical properties of the resultant carbon/carbon composite may be employed.

With regard to carbonization, this term is used in the present specification to indicate the heat treatment of the carbon/carbon composite and binder materials to pyrolyze the resin material to leave residual carbon. This may be done at temperatures ranging between about 600° C. and 1100° C. and is accomplished under an inert atmosphere, such as a nitrogen atmosphere. Various carbonization techniques are also discussed in the aforementioned prior art patents, and the way in which the carbonization is carried out does not, in and of itself, form part of the present invention.

As mentioned previously, there are two principal embodiments of the present invention, one involving the use of activated carbon powder and activated carbon fibers. The ratio in which such materials are used with respect to each other and with respect to the binder can be varied over wide ranges, as will be illustrated in the specific examples described later herein. Generally, however, the resin will comprise approximately 10% to 50% by weight or more of the initial cured material, prior to carbonization, with higher loadings of carbon powder and fiber material being preferred. In our testing, we have achieved highly desirable carbon/carbon composites having 84% total carbon (powder and fiber) containing materials and 16% resin by weight.

With regard to the mixture of powder and fiber, we have carried out experiments in which the ratio of carbon powder to carbon fibers was 50:50 and other testing where the ratio of carbon powder to fiber was 2:3 to 3:2. In practice, the ratio may extend from as little as 20% of one of the components to 80% of that component without departing from the spirit and scope of the present invention.

Proceeding now to a description of the carbon/carbon composites useful in the present invention, reference should be made to Table A showing properties for a variety of composite wafers formed using Novolak phenolic resin, Norit SX2 activated carbon powder and Osaka Gas A20 activated carbon fibers, all in the ratios by weight set forth in the table. The table also illustrates the density of the wafer after carbonization at 800° C. for 2 hours under a nitrogen atmosphere, the resultant composite resistivity, the surface area per unit mass and the strength measured on a scale in which "a" is the strongest and "d" is the weakest.

TABLE A

| COMPOS TYPE | % Total Carbon (AC/ACF) | % Resin | d (g/cm$^3$) | ρ (Ω · cm) | BET (m$^2$/g) | Strength |
|---|---|---|---|---|---|---|
| Powder | 50 | 50 | 0.81 | 0.13 | 440 | d |
| Powder | 60 | 40 | 0.59 | 0.11 | 480 | d |
| Fiber | 50 | 50 | 0.80 | 0.24 | 680 | b |
| Fiber | 70 | 30 | 0.73 | 0.10 | 590 | b |
| Fiber | 80 | 20 | 0.56 | 0.13 | 600 | c |
| Powder/ fiber | 67 (33/33) | 33 | 0.76 | 0.095 | 500 | a |
| Powder/ fiber | 75 (45/30) | 25 | 0.61 | 0.11 | 705 | b |

TABLE A-continued

| COMPOS TYPE | % Total Carbon (AC/ACF) | % Resin | d (g/cm³) | ρ (Ω · cm) | BET (m²/g) | Strength |
|---|---|---|---|---|---|---|
| Powder/fiber | 75 (30/45) | 25 | 0.57 | 0.17 | 830 | b |
| Powder/fiber | 76 (38/38) | 24 | 0.63 | 0.10 | 600 | b |
| Powder/fiber | 84 (42/42) | 16 | 0.61 | 0.15 | 870 | c |

As Table A shows, the composites using activated carbon powder are relatively weak and the loading level is therefore limited to below about 60%. Higher loading levels can be achieved with activated carbon fibers, but they are expensive, and the maximum loading achievable using such fibers is in the 70–80% range. This is because at these levels, the composites exhibit low mechanical strength. Using fiber/powder composites, however, higher loading levels (84% or more) can be attained, thus providing higher surface area, while still maintaining the mechanical strength at desirable levels. The electrodes thus obtained include smaller amounts of fibers and are therefore more cost effective.

Another advantage is that very thin layers can be prepared using the present invention. Electrode layers having a thickness of 1 mm or less are easily prepared and machined. Again, the differences are primarily due to the higher mechanical strength of the electrodes prepared according to the present invention.

It is also possible to optimize the composition with respect to powder/fiber ratios to achieve maximum strength and minimum resistance. As Table A shows, the properties of the composite may change, depending on the ratio between these two components, with a maximum density (strength) and a minimum resistance at an activated carbon/activated carbon fiber ratio of about 1:1.

With regard to electrochemical performance, we have found that the particular type of fiber used also plays a role in the electrical performance of the electrodes.

The carbon/carbon composites of the invention may be used as electrodes in a composite bipolar device. The composite bipolar device is made by a process comprising the steps of first forming at least two of the carbon/carbon composite wafers of the invention; then applying a separating layer to at least one of the wafers; and finally, forming a stack structure by laminating the composite waters together on either side of the separating layer. Examples of suitable separating layers are conductive, non-porous rubber cement and carbon filled polyethylene saturated with electrolyte. Optionally, at least one of the wafers may be laminated to a conductive plastic substrate before forming the stack structure. It is also possible to assemble at least two stack structures to form a bipolar capacitor device. The electrical performance of different composites were evaluated by measuring them as electrodes in an electochemical double layer capacitor. The electrodes were prepared by laminating the composite wafer onto conductive plastic substrate that was connected via copper screen to an electrical circuit. A microporous polyethylene separator saturated with sulfuric acid was used to separate two carbon composite electrodes to form a 1 volt double layer capcitor. The capacitor was charged and then discharged at different current densities and the capacitance and discharge times were measured. As Table B shows, in composites using the same carbon powder, the electrical properties in a capacitor may differ depending on the type of fiber. Composites using fibers with lower density show substantially better performance at higher discharge rates due to the higher porosity of these materials.

TABLE B

| Fiber TYPE | Fiber den (g/cm³) | Fiber BET (m²/g) | Comp. den. (g/cm³) | Cap (Far/cm²) | Dis. t(s) (0.14 A/cm²) |
|---|---|---|---|---|---|
| S1 | 0.36 | 890 | 0.73 | 5.3 | 13 |
| S2 | 0.32 | 1780 | 0.65 | 7.5 | 29 |
| A1 | 0.26 | 1000 | 0.67 | 6.0 | 18 |
| A2 | 0.14 | 2000 | 0.53 | 6.6 | 26 |

With regard to the second embodiment of the invention, many of the comments already made are applicable to the process using an activated carbon cloth. The cloth, preferably of the type identified in the beginning paragraphs of this detailed description, is impregnated with a phenolic resin containing activated carbon powder and cured under pressure. Final carbonization can take place within the temperature ranges set forth above. Several layers of cloth may be combined to form a composite having a final desired thickness.

Advantages of using activated carbon cloth include the low resistivity of the cloth and the ability to easily form thin composites, because of the fact that the cloth can be obtained with a thickness of 10 mils or below. The composite obtained with a cloth also has very good mechanical strength and the thickness of the composite can be changed merely by changing the number of cloth layers. In combining various layers, the carbon may be applied after the layers are laid one upon the other or, in a particularly preferred form of the invention, resin and activated carbon powder are applied between the layers for curing the resin.

While the present invention has been described in connection with certain materials and arrangements, the electrode carbon/carbon composite of the present invention may be manufactured in a variety of shapes and compositions. Accordingly, the invention is not to be limited by the foregoing examples, but only by the scope of the claims which follow.

What is claimed is:

1. A porous carbon/carbon composite electrode comprising
  activated carbon powder and activated carbon fibers in a matrix of a carbonized synthetic resin.

2. The electrode of claim 1, wherein the electrode is made by a process including carbonizing, in a non-oxidizing atmosphere, a cured synthetic resin mixture that includes at least 20% by weight of each of the activated carbon powder and the activated carbon fiber.

3. The electrode of claim 1, wherein the activated carbon powder has an average particle size of from 0.5 to 300 microns.

4. The electrode of claim 1, wherein the activated carbon fibers have an average length of from 1 to 50 mm and an average diameter of from 5 to 50 microns.

5. The electrode of claim 1, wherein the carbonized synthetic resin is a carbonized phenolformaldehyde resin.

6. The electrode of claim 1, wherein the carbonized synthetic resin is obtained by a carbonizing step, in a non-oxidizing atmosphere, carried out at from about 600° C. to about 1200° C.

7. The electrode of claim 2, wherein the total weight of the activated carbon materials exceeds 60% in the mixture.

8. The electrode of claim 1, wherein the ratio of carbon powder to carbon fibers is from 2:1 to 1:2.

9. A porous carbon/carbon composite electrode comprising an activated carbon fabric impregnated with a mixture of activated carbon powder and a carbonized synthetic resin.

10. The electrode of claim 9, wherein the impregnated fabric is made by a process including carbonizing, in a non-oxidizing atmosphere, an activated carbon fabric impregnated with a cured mixture of a synthetic resin and an activated carbon powder, including at least 20% by weight of each of the activated carbon powder and activated carbon fabric.

11. The electrode of claim 9, wherein the activated carbon powder has an average particle size of from about 1 to about 300 microns.

12. The electrode of claim 9, wherein the activated carbon fabric has a thickness of from about 5 to about 10 mils.

13. The electrode of claim 9, wherein the electrode comprises at least two layers of activated carbon fabric.

14. The electrode of claim 10, wherein the carbonizing step is carried out at from about 600° C. to about 1200° C.

15. The electrode of claim 10, wherein the total weight of the activated carbon powder and activated carbon fabric in the mixture exceeds 60%.

16. The electrode of claim 9, wherein the ratio of powder to fabric is from 2:1 to 1:2.

17. A composite bipolar capacitor, comprising a stack structure, said structure comprising a stack of:

a. at least two carbon/carbon composite wafers, each wafer comprising a member selected from the group consisting of
  (i) activated carbon powder and activated carbon fibers in a matrix of a carbonized synthetic resin and
  (ii) an activated carbon fabric impregnated with a mixture of activated carbon powder and a carbonized synthetic resin; and
b. a separating layer between adjacent stacked wafers.

18. The device of claim 17 wherein the separating layer is a conductive, non-porous rubber cement.

19. The device of claim 17 wherein the separating layer is carbon filled polyethylene saturated with electrolyte.

20. The device of claim 17 including the further step of laminating at least one of the wafers to a conductive plastic substrate prior to step (c).

21. The device of claim 17 including the further step of assembling at least two stack structures to form a bipolar capacitor device.

22. A process for increasing the surface area of carbon in a carbon-based electrode, comprising incorporating activated carbon into the electrode according to the steps of:

a. preparing a mixture of activated carbon powder, a synthetic resin, and at least one activated carbon material selected from the group consisting of activated carbon fibers and activated carbon fabric;
b. curing the synthetic resin of the mixture; and
c. carbonizing the synthetic resin in a non-oxidizing atmosphere.

* * * * *